Dec. 1, 1964   R. W. SCHIER   3,159,428
ARTICLE OF SEATING
Filed Feb. 18, 1963   4 Sheets-Sheet 1
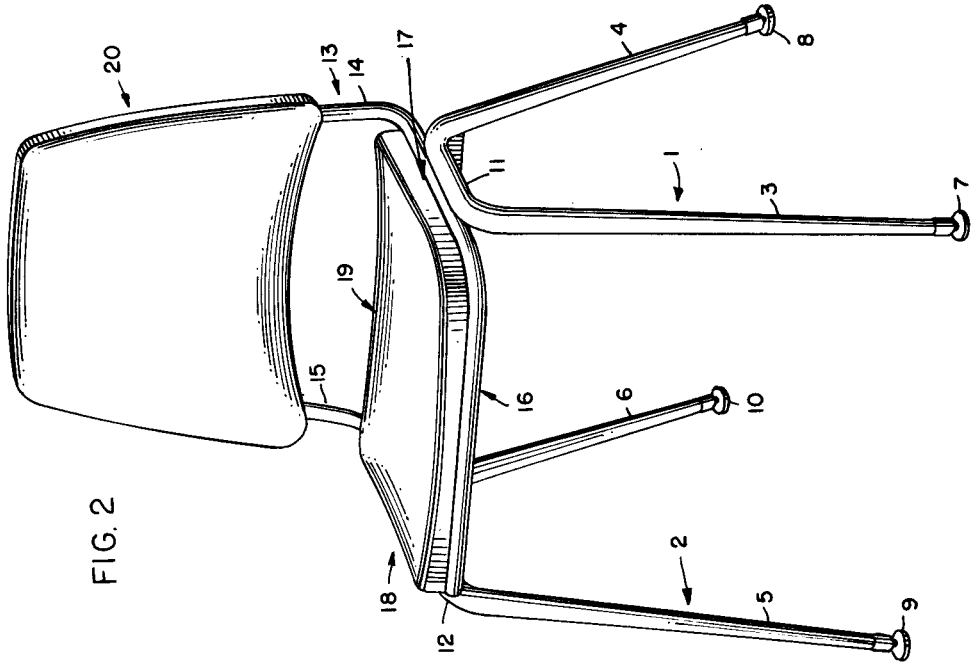
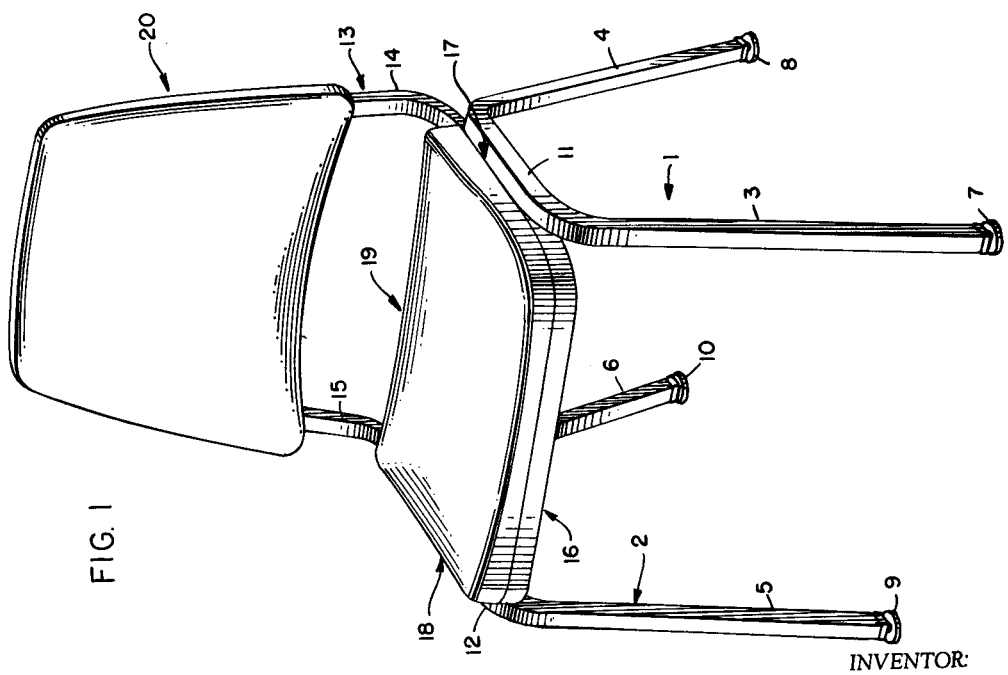
INVENTOR:
ROBERT W. SCHIER
BY Marshall, Johnston
Cook & Root
ATT'YS

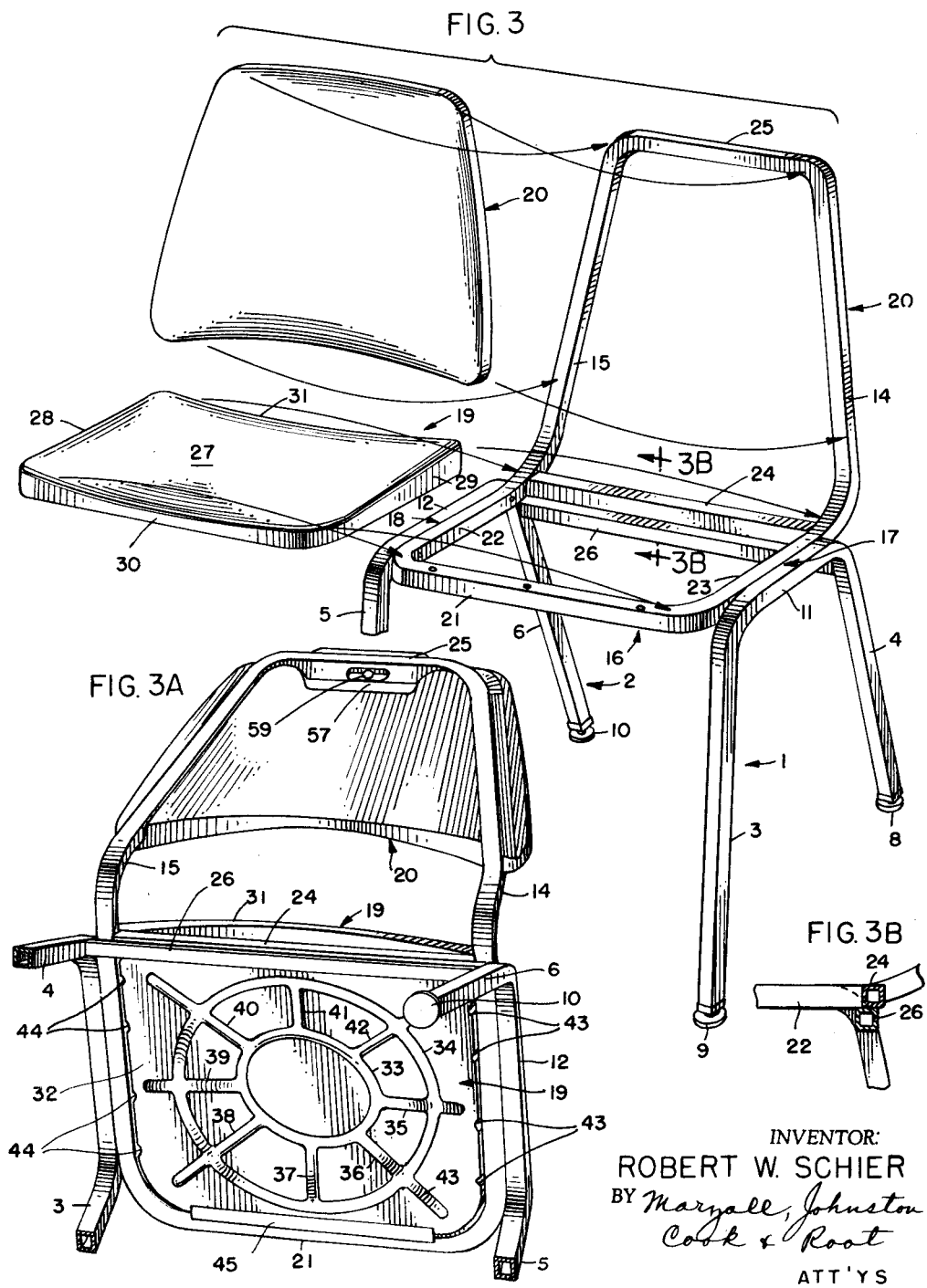

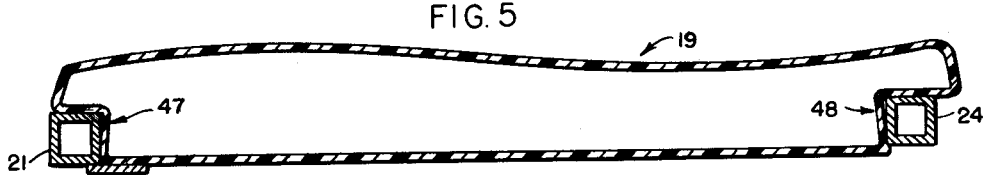
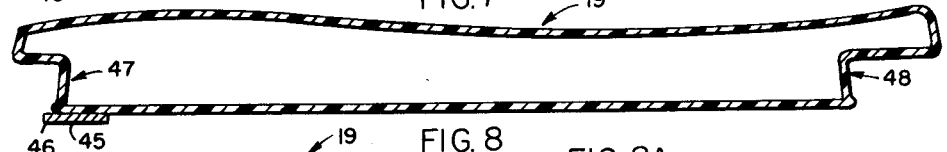
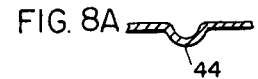
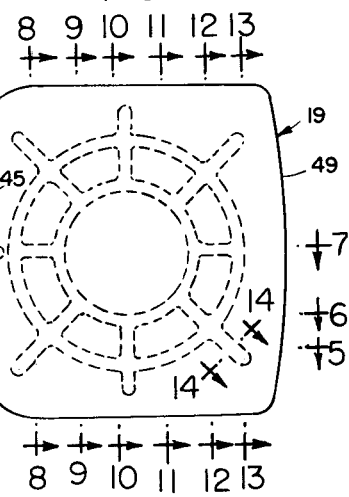
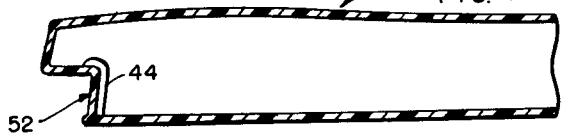
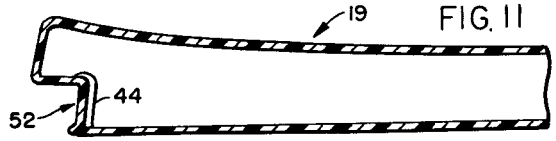
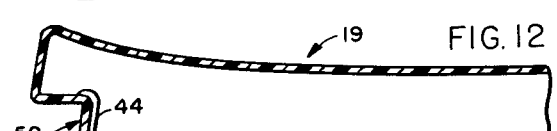
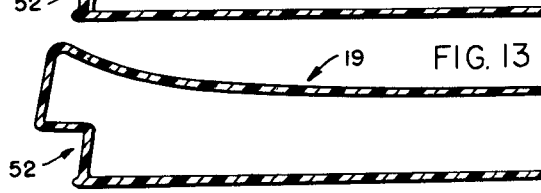

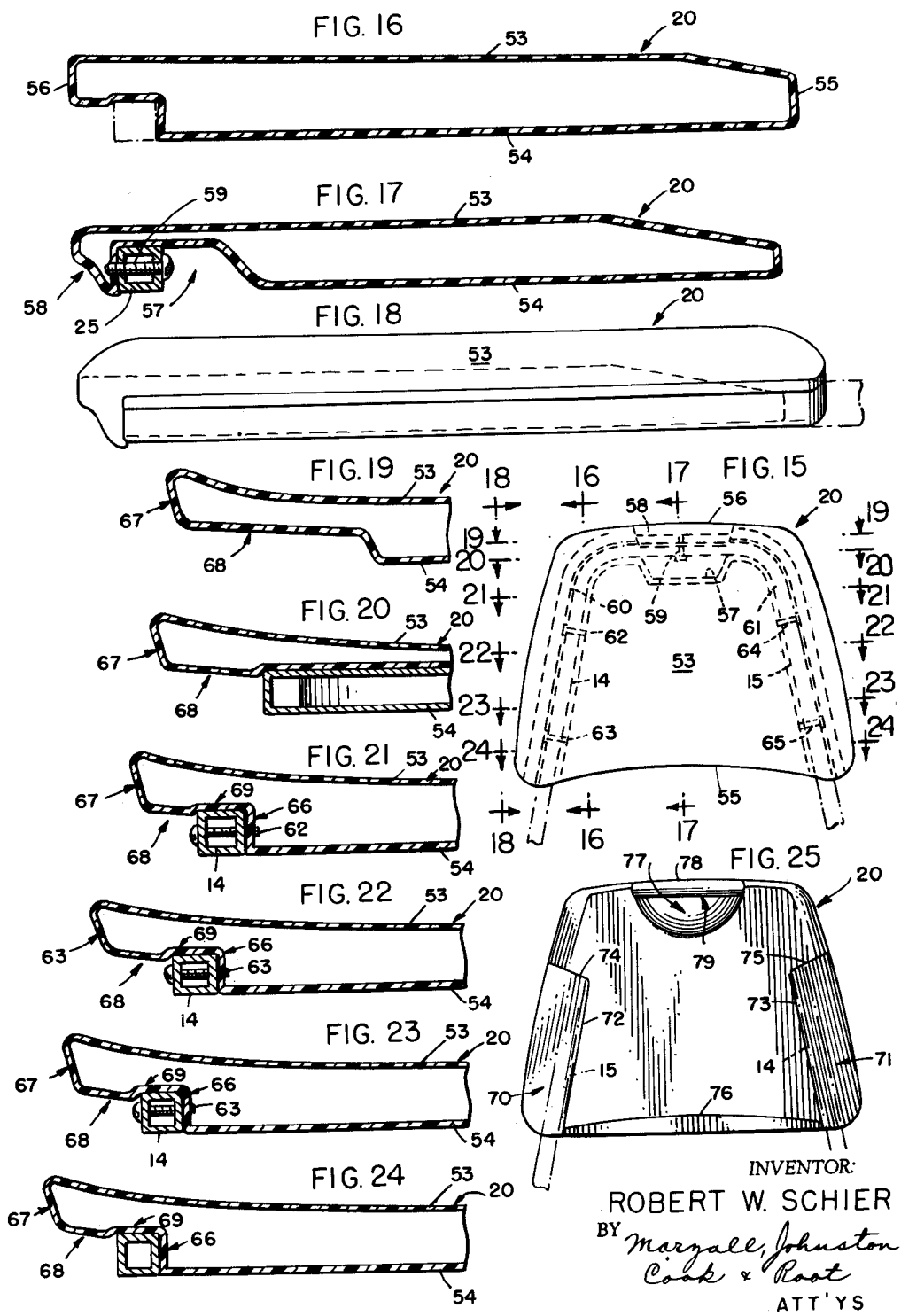

United States Patent Office 3,159,428
Patented Dec. 1, 1964

3,159,428
ARTICLE OF SEATING
Robert W. Schier, Northbrook, Ill., assignor to Arlington Seating Company, Arlington Heights, Ill., a corporation of Illinois
Filed Feb. 18, 1963, Ser. No. 259,194
13 Claims. (Cl. 297—452)

This invention relates to a new and improved article of seating and more particularly to a new and improved type of chair. The invention is especially concerned with the manufacture of a stacking chair.

One of the objects of the invention is to provide an article of seating in which the seating surface and the back supporting surface are constructed from a synthetic polymer or resin.

Another object is to provide an article of seating of the type described in which the seating surface and the back supporting surface can be shaped to provide a maximum amount of comfort at a minimum cost.

Still another object of the invention is to provide an article of seating which is strong and sturdy, yet relatively simple to construct.

A more specific object of the invention is to provide an article of seating in which the seating member and the back supporting member consist of envelopes of a synthetic polymer constructed in such a manner that they can be readily secured to the frame members of a chair.

Another specific object of the invention is to provide seating members and back supporting members of the type described in which the resiliency can be controlled.

Still a further specific object of the invention is to provide new and improved stacking chairs which can be stacked, one on top of the other, in order to reduce the space required for storage.

Other objects and advantages of the invention will appear from the following description in conjunction with the accompanying drawings in which—

FIGURE 1 is a perspective view of a chair showing one embodiment of the invention;

FIGURE 2 is a perspective view showing another embodiment of the invention;

FIGURE 3 is an exploded view showing the frame of the chair of FIGURE 1, and the manner in which the seating member and the back supporting member are associated therewith;

FIGURE 3A is a back and bottom view of the chair shown in FIGURE 3 after the seating member and the back member have been assembled on the frame;

FIGURE 3B is a partial cross sectional view taken along the line 3B—3B of FIGURE 3;

FIGURE 4 is a top plan view of the seating member of the chair shown in FIGURE 3;

FIGURE 5 is a sectional view taken through the line 5—5 of FIGURE 4;

FIGURE 6 is a sectional view taken through the line 6—6 of FIGURE 4;

FIGURE 7 is a sectional view taken through the line 7—7 of FIGURE 4;

FIGURE 8 is a partial sectional view taken through the line 8—8 of FIGURE 4;

FIGURE 8A is a sectional detail taken through the line 8A—8A in FIGURE 8.

FIGURE 9 is a partial sectional view taken through the line 9—9 of FIGURE 4;

FIGURE 10 is a partial sectional view taken through the line 10—10 of FIGURE 4;

FIGURE 11 is a partial sectional view taken through the line 11—11 of FIGURE 4;

FIGURE 12 is a partial sectional view taken through the line 12—12 of FIGURE 4;

FIGURE 13 is a partial sectional view taken through the line 13—13 of FIGURE 4;

FIGURE 14 is a partial sectional view taken through the line 14—14 of FIGURE 4;

FIGURE 15 is a front view of the back supporting member or back member of the chair shown in FIGURE 3;

FIGURE 16 is a sectional view taken through the line 16—16 of FIGURE 15;

FIGURE 17 is a sectional view taken through the line 17—17 of FIGURE 15;

FIGURE 18 is a side view taken along the line 18—18 of FIGURE 15;

FIGURE 19 is a partial sectional view taken along the line 19—19 of FIGURE 15;

FIGURE 20 is a partial sectional view taken along the line 20—20 of FIGURE 15;

FIGURE 21 is a partial sectional view taken along the line 21—21 of FIGURE 15;

FIGURE 22 is a partial sectional view taken along the line 22—22 of FIGURE 15;

FIGURE 23 is a partial sectional view taken along the line 23—23 of FIGURE 15;

FIGURE 24 is a partial sectional view taken along the line 24—24 of FIGURE 15; and FIGURE 25 is a rear view of a modified form of back member.

In accordance with the invention a stacking chair is provided comprising (a) a pair of inverted, generally U-shaped side frame members forming legs, (b) a back member including at least two opposed upwardly extending side members, (c) a generally rectangular seat frame connected to said back frame member and secured on its opposite outer sides to the transverse portions of said inverted generally U-shaped side frame members, (d) a seating member comprising a molded envelope of a synthetic polymer having an upper contoured seating surface, the sides of said seating surface extending over the tops of the sides of said seat frame but stopping short of the tops of said inverted generally U-shaped side members, the front of said seating member extending over the top of the front of said seat frame, the back of said seating member extending over the top of the back of said seat frame, the bottom of said seating member being offset inwardly at its sides, front and back and the offset portion extending downwardly adjacent the inner sides, front and back, respectively, of said seat frame, (e) a back member comprising a molded envelope of a synthetic polymer having a front contoured back supporting surface, the sides of said front surface extending over the front portions of at least the upper part of said back frame member and projecting laterally beyond the sides of said side members of said back frame member, and the top of said back member extending above the top of said back frame member, (f) means retaining said seating member in said seat frame, and (g) means securing said back member to said back frame.

As previously indicated, the seating member and the back supporting member both consist of a molded envelope of a synthetic polymer or resin. The term "polymer" as used herein is intended to cover homopolymers, such as, for example, polyethylene, polypropylene, polymers of formaldehyde (e.g., Delrin), polyvinyl chloride, polymers of tetrafluoroethylene (e.g., Teflon), and copolymers of two or more monomers or of monomers having two or more functional groups (e.g., polyamides, such as nylon, or polyesters, such as Dacron). The seating member and the back supporting member can be molded from these synthetic polymers as single pieces or the fronts and backs of these members can be molded separately and then sealed together.

The seating member is molded or otherwise formed to make an envelope having an upper contoured seating surface with the sides, front and back of said seating member extending downwardly and then being offset inwardly and downwardly to provide a space adapted to accommodate a generally rectangular seat frame.

The back supporting member is molded or otherwise formed to have a front contoured surface and a recessed back portion adapted to accommodate a back frame member whereby when said back supporting member is assembled with said frame member the frame member will be seated in said recess and the sides and top of said back supporting member will extend beyond the sides and top of said back frame member.

The hollow spaces in the interiors of the seating member and/or the back supporting member can be at least partially filled with a resilient material, such as, for example, a polyurethane foam, or they can be allowed to remain hollow. In either event, any openings in these members which communicate with the hollow interiors are sealed in any suitable manner, for example, by securing a plug or sheet of the same material in or over such openings.

A feature of the invention is the provision of a handhold recess in the upper part of the back supporting member whereby a chair can be grasped by one hand and readily moved from one place to another.

Referring to FIGURE 1, the chair shown therein which illustrates one embodiment of the invention has two inverted, generally U-shaped side frame members 1 and 2 forming legs 3, 4, 5 and 6. Secured to the lower parts of the legs are leveling devices 7, 8, 9 and 10 which do not form a part of this invention. The transverse portions of the inverted, generally U-shaped side frame members are indicated by the numerals 11 and 12.

The back frame member generally indicated at 13 has two opposed upwardly extending side members 14 and 15 which are integrally connected to a seat frame generally indicated at 16. The seat frame 16 is generally rectangular and is welded or otherwise secured to the transverse portions 11 and 12 of the respective side frame members 1 and 2 at 17 and 18. A seating member 19 is secured to the rectangular seat frame 16 and a back supporting member 20 is secured to the upwardly extending side members 14 and 15 of the back frame member 13, as hereinafter described.

In FIGURE 2, like members refer to like parts of FIGURE 1, the only difference being that the side frame members 1 and 2, the back frame 13 and the seat frame 16 are formed from metal tubing which is circular in cross section and tapering in the legs 3, 4, 5 and 6, whereas in FIGURE 1 the corresponding parts are formed from either tubing or bars which are substantially rectangular in cross section.

As shown in FIGURE 3, the back frame member 20 is integral with the seat frame member 16. The seat frame member 16 is generally rectangular and comprises a transverse front portion 21, a pair of side members 22 and 23 and a transverse back portion 24. The side members 22 and 23 are integral with the transverse front member 21 and also with the upwardly extending side members 14 and 15 of the back frame 20. The members 14 and 15 are likewise integrally connected to the transverse member 25 near the top of the chair. The cross member 24 is welded or otherwise secured to the side members 22 and 23, thereby providing a generally rectangular seat frame adapted to receive the seating member 19. An additional cross member 26 is welded or otherwise secured to the legs 4 and 6 to reinforce the chair structure and increase the rigidity of the legs 4 and 6. The relative positions of the cross members 24 and 26 is best shown in FIGURE 3B.

The seating member 19 has an upper contoured seating surface 27 with sides 28 and 29 that extend over the tops of the members 22 and 23 of the seat frame 16 when the seating member 19 is positioned in the seat frame 16. However, the sides 28 and 29 stop short of the tops of the cross members 11 and 12 of the inverted, generally U-shaped side members 1 and 2. The front 30 of the seating member 19 extends over the top of the front of the transverse member 21 and the back 31 of the seating member 19 extends over the top of the back of the transverse member 24. The bottom 32 (see FIGURE 3A) of the seating member 19 is offset inwardly at its sides, front and back as shown in FIGURES 5 to 13 of the drawings, and the offset portion extends outwardly adjacent the inner sides, front and back, respectively, of the generally rectangular seat frame 16.

An optional but preferred embodiment of the invention is the provision of circular reinforcing grooves 33 and 34 and radial reinforcing grooves 35, 36, 37, 38, 39, 40, 41 and 42 in the bottom 32 of the seating member 19. It will be observed from FIGURE 3A that the reinforcing grooves which are on the diagonal are longer and extend to points adjacent the corners of the seat member 19. The reinforcing grooves 35 and 39 which run transversely also extend beyond the circular reinforcing groove 34. Additionally, vertical grooves 43 and 44 are provided on opposite sides of the offset portions of the seating element 19 in order to reinforce it vertically. A flange member 45 is heat sealed or otherwise secured to the bottom 32 of the seating member 19 and has a projecting portion 46 which is adapted to engage the underside of the transverse member 21 as shown in FIGURE 5. The offset portions 47 and 48 are undercut or sloped downwardly and outwardly so that the seating element 19 can be snapped into place into the frame member 16 by first inserting the front portion so that the projection 46 engages beneath the transverse member 21 and then pressing downwardly until the undercut rear portion 48 engages beneath the transverse member 24. Auxiliary means, such as screws and bolts, can also be inserted through the front and rear members 21 and 24 to hold the seating member 19 in place. The transverse members 21 and 24 have been omitted in FIGURES 6 to 13 of the drawings.

Referring to FIGURE 4 it will be noted that the rear edge 49 of the seating member 19 is arcuate and projects rearwardly a greater distance at its center than on either side. In the manufacture of the envelope 19, a small hole 50 is normally formed in the bottom thereof as shown in FIGURE 4 and this is sealed in any suitable manner, for example, by heat sealing a small piece of a corresponding synthetic polymer in the sides of said hole. In some cases, it is desirable to introduce a resilient material, such as, a polyurethane foam, into the hollow space of the envelope 19 and such material is injected through the opening 50 before the latter is sealed. In such event, the injected material can also provide the seal for the opening 50. Whether such a resilient material is incorporated into the seating member will depend upon the resilient qualities desired and the type of polymer employed in making the seating member. Thus, if a relatively rigid polymer, such as polyethylene, is employed, which nevertheless has some resiliency, the injection of another material on the inside of the envelope is normally unnecessary. On the other hand, if the seating member is formed from a more flexible material, such as polyvinylchloride, the injection of a resilient material into the hollow space inside the envelope provides reinforcement as well as resiliency to the resilient seating member.

In FIGURE 8 it will be noted that the vertical reinforcing grooves 44 and the corresponding reinforcing grooves 43 on the opposite sides (not shown) extend vertically and also outwardly for a short distance at the corner 51 of the offset portion. FIGURE 8A illustrates the manner in which the grooves 44 project inwardly toward the hollow interior of the envelope. It will be noted that the sides 52 of the seating member 19 are offset inwardly and slope downwardly and outwardly so that they are adapted to engage the side members 22 and 23 of the rectangular frame 16.

Referring to FIGURES 15 to 24, it will be seen that the back member 20 consists of a molded envelope of a synthetic polymer having a front contoured face 53, a rear surface 54, a lower surface 55 and a top surface 56. The lower surface is preferably arcuate as shown in FIGURE 15. The front surface 53 is contoured as shown in FIGURES 19 to 24. The upper central part of the rear surface 54 is provided with a recessed portion 57 and a projecting portion 58 whereby the fingers of a hand can be inserted into the recessed portion in order to lift the chair. In the embodiment of the invention previously described, the cross member 25 of the back frame 20 is adapted to contact the lower side of the projecting element 58 as shown in FIGURE 17 and a screw 59 or other suitable means is inserted through the cross member 25 and the lower part of the projecting element 58 thereby securing the cross member 25 to the back member 20.

In an alternative construction as shown by the broken lines in FIGURE 15, the side members 14 and 15 can be cut off at 60 and 61, respectively, thereby eliminating the cross member 25 and the fastening means 59. In this case one grasping the chair to move it would place the fingers of one hand beneath the underside of the rearward projection portion 58 of back member 20.

The back member 20 is also fastened to back frame members 14 and 15 by means of screws 62, 63, 64 and 65, or other suitable means passing through the frame members 14 and 15 and the offset portion 66 in the sides of back member 20 as shown in FIGURES 21, 22 and 23.

Referring to FIGURES 19 to 24 it will be noted that the sides of the back member 20 slant inwardly at 67 and then are offset inwardly at 68, the offset portion being provided with a groove or recess 69 adapted to receive upwardly extending side members 14 and 15. The offset portion then extends rearwardly at 66 so as to contact the inner sides of the upwardly extending side members 14.

In the modification shown in FIGURE 25 a rear view of a modified form of the back member 20 is shown which is especially adapted for the manufacture of a chair where the upwardly extending side members 14 and 15 are disposed in recesses 70 and 71 directly contacting the walls 72 and 73 of said recesses and terminating against the walls 74 and 75 at the ends of said recesses. The recesses 70 and 71 are deep enough so that they cover the ends of the upwardly extending side members of the back frame and the latter do not require expensive finishing. In this structure a reinforcing ridge is provided at 76 and a recessed area is provided at 77 so that the fingers of the hand can grasp the substantially circular transverse portion 78 which is undercut at 79. The front of the modified form of the back member shown in FIGURE 25 is the same as the front of the back member described in FIGURES 15 to 24.

It will be recognized that there are other modifications which can be made in the specific details of construction without departing from the invention.

The invention is hereby claimed as follows:
1. A chair comprising:
 (a) a pair of inverted, generally U-shaped side frame members forming legs,
 (b) a back frame member including at least opposed upwardly extending side members,
 (c) a generally rectangular seat frame connected to said back frame member and secured on its opposite outer sides to the transverse portions of said inverted generally U-shaped side frame members,
 (d) a seating member comprising a molded hollow, sealed envelope of a synthetic resilient polymer having an upper contoured seating surface, the sides of said seating surface extending over the tops of the sides of said seat frame but stopping short of the tops of said inverted generally U-shaped side members, the front of said seating member extending over the top of the front of said seat frame, the back of said seating member extending over the top of the back of said seat frame, the bottom of said seating member being offset inwardly at its sides, front and back and the offset portion extending downwardly adjacent the inner sides, front and back, respectively, of said seat frame,
 (e) a back member separate from the seating member and comprising a molded hollow, sealed envelope of a synthetic resilient polymer having a front contoured back supporting surface, the sides of said front surface extending over the front portions of at least the upper part of said back frame member and projecting laterally beyond the sides of said side members of said back frame member, and the top of said back member extending above the top of said back frame member,
 (f) means retaining said seating member in said seat frame, and
 (g) means securing said back member to said back frame.

2. A chair as claimed in claim 1 in which said seating member is provided on the bottom surface with a plurality of reinforcing grooves which extend circularly and radially.

3. A chair as claimed in claim 1 in which said back member is provided with a recessed portion in the upper part near the top thereof to permit said chair to be grasped and lifted by hand.

4. A chair as claimed in claim 3 in which the top of said back member is secured to a cross member of said back frame adjacent said recessed portion.

5. A chair as claimed in claim 1 in which at least some of the offset portions in the sides of the seating member (d) slant downwardly and outwardly and said downwardly and outwardly slanting portion engages at least some of the inner sides of the rectangular seat frame (c).

6. A chair as claimed in claim 1 in which the rectangular seat frame (c) consists in part of a rear cross member secured between the opposite sides of said seat frame, and the rear of said seating member (d) rests on said cross member.

7. A chair as claimed in claim in which (b) has an inverted generally U-shaped structure.

8. A chair as claimed in claim 1 in which (b) comprises a pair of upwardly extending side members which terminate short of the top of the chair, and the back of (e) is formed with a recess therein, the sides of which lie adjacent the inner sides of said side members and turn laterally outward adjacent the tops of said side members of (b).

9. A seating member for a chair comprising a molded hollow, sealed envelope of a synthetic resilient polymer having an upper contoured seating surface, the sides, front and back of said seating member extending downwardly and then being offset inwardly and downwardly to provide perimeter area adapted to contact only the upper and inner sides of a generally rectangular seat frame.

10. A seating member as claimed in claim 9 having a bottom which is provided with circular and radially extending grooves.

11. A seating member as claimed in claim 9 in which said offset portion has at least one vertically extending recess in each side thereof.

12. A back supporting member for a chair comprising a molded hollow, sealed envelope of a synthetic resilient polymer having a front contoured surface and a back portion having a plurality of recesses extending upwardly and open rearwardly adapted to accommodate a plurality of back frame members extending in the same direction as said recesses whereby when said back supporting member is assembled with said frame members the frame members will be seated in said recesses and the sides and top of said back supporting member will extend beyond the sides and top of said back frame members.

13. A back supporting member as claimed in claim 12 in which a hand hold recess is moulded into the upper part of the back of said back supporting member.

References Cited in the file of this patent

UNITED STATES PATENTS

| | | |
|---|---|---|
| 2,333,311 | Greitzer | Nov. 2, 1943 |
| 2,646,840 | Good | July 28, 1953 |
| 2,747,654 | Chapman et al. | May 29, 1956 |
| 2,815,067 | Richardson | Dec. 3, 1957 |
| 2,824,602 | Collins et al. | Feb. 25, 1958 |
| 2,847,062 | Henrikson et al. | Aug. 12, 1958 |
| 2,955,296 | Zapolski | Oct. 11, 1960 |
| 2,961,037 | Keefer | Nov. 22, 1960 |
| 3,055,708 | Baermann | Sept. 25, 1962 |

FOREIGN PATENTS

| | | |
|---|---|---|
| 471,625 | Canada | Feb. 20, 1951 |
| 919,259 | Germany | Oct. 18, 1954 |